US007777904B2

(12) United States Patent
Van Den Tillaart et al.

(10) Patent No.: US 7,777,904 B2
(45) Date of Patent: Aug. 17, 2010

(54) COORDINATED CONCURRENT PRINTING OF PRINT JOBS CONTAINING PAGES THAT ARE INCOMPATIBLE WITH A SINGLE PRINTER

(75) Inventors: Robertus C. W. T. M. Van Den Tillaart, Gemert (NL); Monica M. W. M. Roosen, Berlicum (NL); Gerardus J. Rozing, Horst (NL); Arie Leppink, Venlo (NL)

(73) Assignee: OCÉ-Technologies B.V., Venlo (NL)

( * ) Notice: Subject to any disclaimer, the term of this patent is extended or adjusted under 35 U.S.C. 154(b) by 1181 days.

(21) Appl. No.: 11/062,448

(22) Filed: Feb. 22, 2005

(65) Prior Publication Data

US 2005/0195431 A1   Sep. 8, 2005

(30) Foreign Application Priority Data

Feb. 19, 2004 (EP) .................................. 04075536

(51) Int. Cl.
*G06K 15/00* (2006.01)
*G06F 3/12* (2006.01)
(52) U.S. Cl. ..................... 358/1.15; 358/1.16; 358/1.17
(58) Field of Classification Search ....... 358/1.12–1.18, 358/1.9, 2.1, 1.1, 1.2, 296, 305
See application file for complete search history.

(56) References Cited

U.S. PATENT DOCUMENTS

| 5,140,674 | A | | 8/1992 | Anderson et al. | |
|---|---|---|---|---|---|
| 5,978,557 | A | * | 11/1999 | Kato | 358/1.15 |
| 6,977,735 | B1 | * | 12/2005 | Ookuma | 358/1.13 |
| 7,352,487 | B2 | * | 4/2008 | Tokashiki | 358/1.18 |
| 2002/0051176 | A1 | | 5/2002 | Kato | |
| 2002/0105672 | A1 | | 8/2002 | Housel | |
| 2003/0133146 | A1 | * | 7/2003 | Parry | 358/1.15 |

FOREIGN PATENT DOCUMENTS

EP   1 229 728 A2   8/2002

(Continued)

OTHER PUBLICATIONS

Morgan, "Integration of Black Only and Color Printers", Xerox Disclosure Journal, Xeros Corporation, Stamford, Conn, USA, vol. 16, No. 6, pp. 381-383 (1991).

*Primary Examiner*—James A Thompson
(74) *Attorney, Agent, or Firm*—Birch, Stewart, Kolasch & Birch, LLP (57) ABSTRACT

A method and system for printing documents are provided. New print jobs are automatically analysed with respect to the device-specific properties of the individual pages and each page is designated, on the basis of the analysis, either for processing on a printer of the first type or the second type. Then, the jobs are made locally available for printing on each of the printers. A user may locally start a job on any of the printers and that printer then automatically selects and prints only the pages of the job that are designated for processing on its own type of printer. Then, the user may locally start that same job on any of the printers of the other type and that printer then also automatically selects and prints only the pages of the job designated for processing on its own type of printer.

20 Claims, 8 Drawing Sheets

FOREIGN PATENT DOCUMENTS

| | | |
|---|---|---|
| JP | 10-320136 A | 12/1998 |
| JP | 2000-112688 A | 4/2000 |
| JP | 2001-34430 A | 2/2001 |
| JP | 2002-218258 A | 8/2002 |
| JP | 2003-125141 A | 4/2003 |
| JP | 2003-345550 A | 12/2003 |
| WO | EP 1 215 879 A2 | 6/2002 |

* cited by examiner

COORDINATED CONCURRENT PRINTING OF PRINT JOBS CONTAINING PAGES THAT ARE INCOMPATIBLE WITH A SINGLE PRINTER

This application claims the priority benefit of the European Patent Application No. 04075536.5 filed on Feb. 19, 2004, which is hereby incorporated by reference.

BACKGROUND OF THE INVENTION

1. Field of the Invention

The invention generally relates to distributed printing, wherein printers with different capabilities can be effectively combined to print documents including pages having different device-specific properties, such that some of the pages must be printed on a printer of a first type and other pages must be printed on a printer of a second, different, type. More in particular, the invention relates to a method of printing such documents, based on automatically analyzing the data of the print job with respect to device-specific properties of its pages and designating each page, on the basis of the analysis, either for processing on a printer of the first type or for processing on a printer of the second type.

2. Discussion of the Related Art

One example of device-specific properties of pages is the existence of colour in some of the document pages, while other pages contain only black-and-white image elements. Such print jobs cannot be completely printed on a black-and-white-only printer without losing image information. One solution would be to use a colour printer. A colour printer would be able to print such a print job in its entirety, but colour printers are generally slower and more expensive to use. Another possible solution would be to split the print file into a colour-containing part and a black-and-white-only part, and print each part on an appropriate printer. This may be cost-effective and may increase processing speed, but it requires that the user himself split the print file in two parts, and after printing merges the prints into one print set, which takes great precision and is error-prone.

This problem may be partly solved by a method known from U.S. Pat. No. 5,978,557, which discloses a system that checks every page of a print job for the presence or absence of colour, and automatically sends pages containing colour to a colour printer and pages not containing colour to a monochromatic (i.e. black-and-white) printer. Flag sheets are inserted in the monochrome print set to indicate the places where colour prints are to be inserted. Although this known method saves a user the effort of splitting a print file into parts, this method takes over control of the process from the user who cannot choose the printers used for the job any more and, moreover, still leaves him with extra work of merging the prints from the different printers later.

SUMMARY OF THE INVENTION

It is an object of the present invention to solve the problem of printing mixed print jobs, i.e. print jobs that contain pages that can only be printed on different dedicated printer devices, while leaving the user a full control over the processing, in particular, the selection of printers and the choice of an appropriate moment for the processing.

It is another object of the present invention to solve the problems and limitations associated with the related art.

According to an aspect of the present invention, there is provided a method comprising: making a job locally available on a plurality of connected printers, for printing, upon a local print command for the job on a printer of a first type; automatically selecting and printing only the pages of the job that are designated for processing on a printer of the first type; and upon locally starting of the job on a printer of a second type, automatically selecting and printing only the pages of the job that are designated for processing on a printer of the second type.

Thus, according to the invention, a user may simply walk up to the dedicated printer he chooses and select and start his print job, and the printer will only print the pages that were designated for that printer (type). Then, the user may walk to a printer of another type, select his same job, and the printer will only print the pages designated for that printer (type). Merging of the pages may be done automatically, when the user loads the prints he has made at the first printer into the second printer as insert sheets. This leaves the user in full control of the print process. For instance, the user does not have to search for the prints made at the two devices among the print jobs printed there, because he is present at the moment the job is being processed.

Other examples of print jobs needing processing on different devices are jobs using different paper sizes, e.g. A4 and A3, when a fast printer can only print on A4 size paper and a printer being able to print on A3 is much slower. Further, print jobs may include pages encoded in different PDL, such as PostScript and PCL, requiring different printers for processing. The invention applies to these situations.

The invention also provides a printing system in which the method according to the invention is implemented, and software implementing in part, as needed, the steps of the present method.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE DRAWINGS

Embodiments and advantages of the invention will be explained hereinafter by reference to the appended drawings, in which like reference numbers designate corresponding elements. In the drawings.

DETAILED DESCRIPTION OF THE PREFERRED EMBODIMENTS

Figure 1:
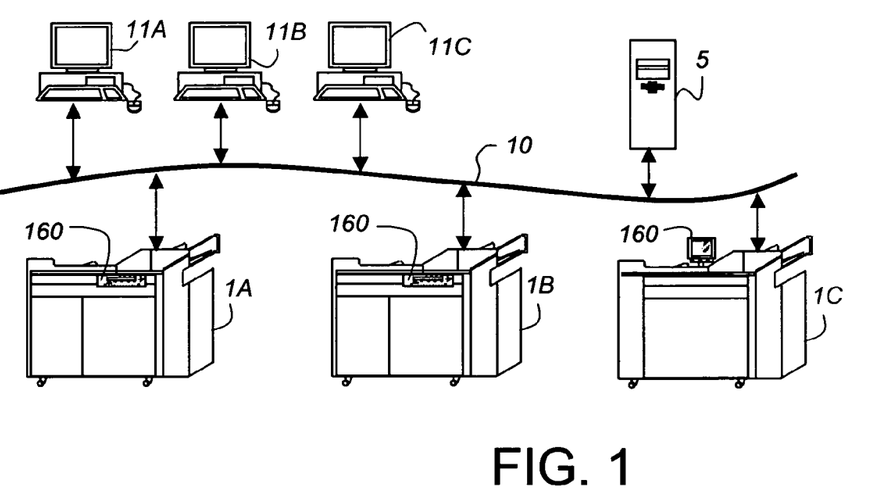
FIG. 1 shows an outline of a network system including a plurality of workstations and printers and a Print Server according to the invention.

FIG. 1 shows a general outline of a network system including a plurality of workstations 11A, 11B, 11C, a plurality of printers 1A, 1B (both being black-and-white-only printers) and 1C (a colour printer), and a print server 5, all connected to a network 10. All the components of the network system are operatively coupled.

The printers 1A, 1B, 1C are each equipped with an operator control panel 160 for operation, that is provided with a display and keys and is connected to an operator control unit of the printer. The printers may be embodied as digital copiers, as is the case in this example, but also printers proper provided with a suitable operator control unit and a control panel.

In the following description, the terms "print file" and "print job" are used indifferently. They are meant to relate to the same entity, although their names stress different aspects of it, namely the data file aspect and the administrational aspect, respectively.

Within the context of the present invention, digital data files which are sent to any of the devices 1A, 1B, 1C via the network 10 for printing, are either of a first type or of a second type. Files of the first type are required to be printed directly, i.e. without further action on the part of an operator at the apparatus, while files of the second type are required only to be stored in the memory of the apparatus and not to be printed until an operator explicitly so requests at the apparatus by selecting a desired file via the operator control panel. The type of file involved is machine-recognizable from an attribute added to the file.

Processing of a data file of the first type is referred to as automatic printing (AP). Processing of a data file of the second type is referred to as "interactive printing" (IP).

While AP print jobs are submitted to a particular printer and are in principle handled by that printer, IP print jobs are automatically shared by all printers or a predefined group thereof, and are made available for selection and processing at any of these devices such that a user may freely choose one of the printers for printing his print jobs. This will hereinafter be called "unchained-printing". The concepts of interactive printing and unchained printing are described extensively in Applicants' European Patent Application Publication No. EP 1 229 724.

Generally, the concept of "unchained printing" includes a server function (called "UPS" (Unchained-Printing Server), hereinafter) and an associated print data storage function, which may be implemented in one of several ways and in different physical locations in the system, to be described below.

The process as contemplated in the present invention will now be described with reference to FIGS. 2, 7 and 8. It is noted that the process is in principle a variant of interactive printing (IP).

Figure 2:
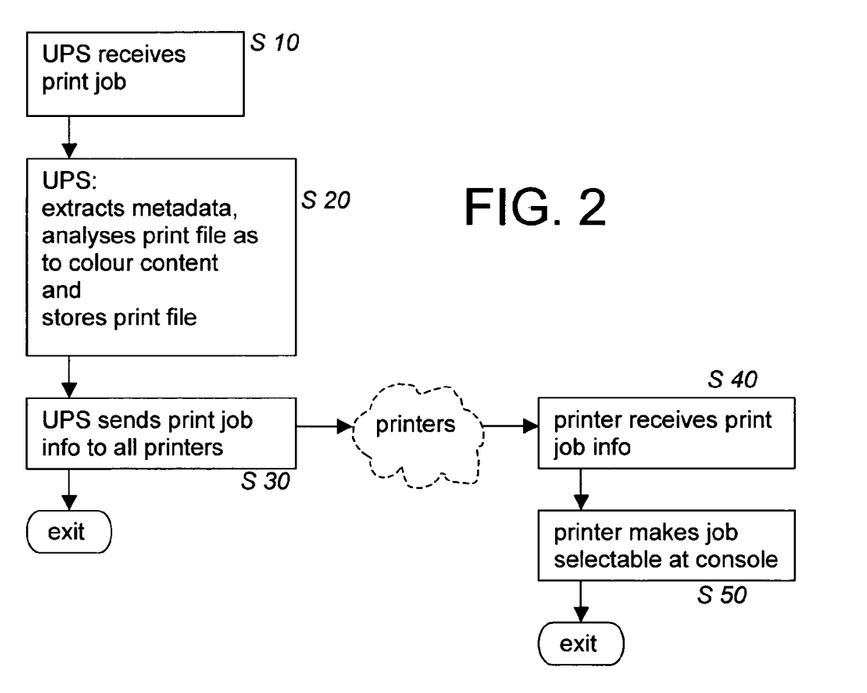
FIG. 2 is schematic drawing of an Unchained Printing process as used in the present invention.

In a first stage of the process, as shown in FIG. 2, an interactive print file is submitted by a workstation and is received by the server function UPS (S10). The server function stores the print data in an associated storage and extracts "metadata" from the file. Metadata include information contained in the file, but not the actual print image data. Examples of metadata are identification data of the file, such as the name of the user/owner and the name of the file, the time of arrival of the print file at the server, print process settings and colour content of the respective pages of the document represented by the print file (S20). The colour content of the pages is determined by the UPS by "preflighting" the print file, an operation in which the print file is analysed, but not completely RIPped. The colour content analysis may designate a page as "coloured", when that page contains at least one coloured pixel or element, but preferably, it will include a mechanism for weighing the importance of the coloured element and will discard non-functional colours. A technique of assessing the functional value of colour in a document is for instance disclosed in Applicants' copending European Patent Application Publication No. EP-A 1 367 814. Other techniques simply count colour pixels and only if their number exceeds a predetermined threshold value, designate the image as "coloured". Of course, thresholds may be different for different colours.

The server function UPS sends the metadata of a newly arrived print job to all connected printers (S30).

The printers receive the metadata (S40) and include the new job in their administration systems to make them selectable for printing (S50), even though they do not have the actual print image data stored locally. This is a preparing step in the print process according to the present invention.

Before explaining the further procedure according to the invention, first the internal structure of the printers and the UPS 5 will now be described.

Figure 3:
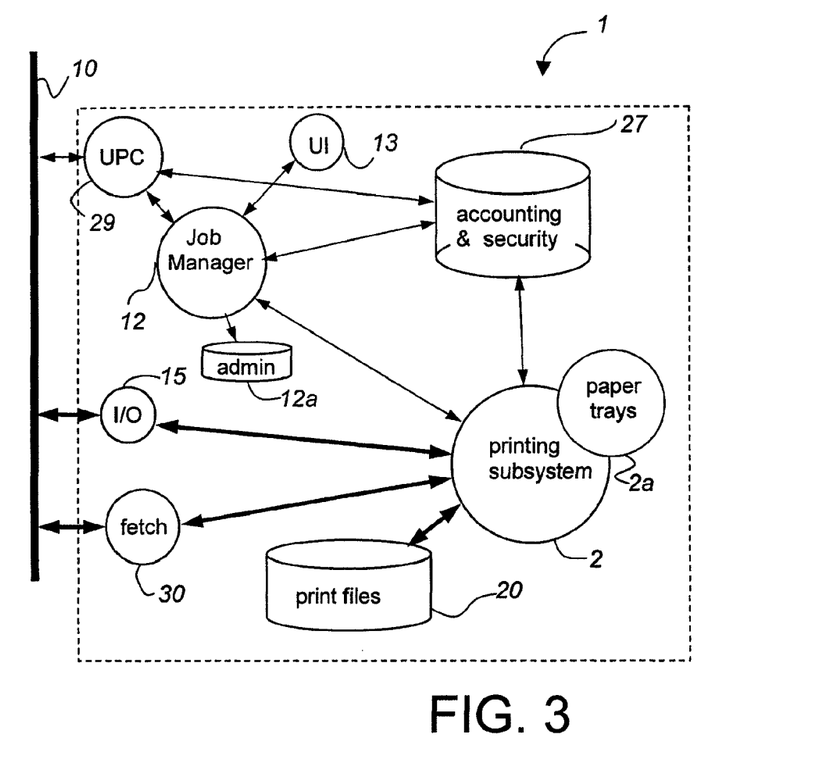
FIG. 3 is a diagram showing an exemplary printing device according to the present invention.

FIG. 3 is a diagram showing the constituent parts of an exemplary printing device for use with the present invention. The description applies to both colour and black-and-white-only printers.

The device 1 (which corresponds to any of the devices 1A, 1B or 1C in FIG. 1) comprises a printing subsystem 2 which contains a printer engine, a memory, a finishing subsystem for, e.g., stapling, and a dedicated control unit (not shown because this part of the device is known). The printer engine is equipped with several storage trays 2a for paper stock.

Further, the device 1 also includes a number of units required to print digital image data which are fed via the local network 10, such as:

- a management unit 12, hereinafter referred to as the "JobManager", which manages the processing and also maintains an administration system for all copying, scanning and print jobs present,
- an administration system (database) 12a for jobs maintained by the JobManager 12,
- an operator control unit 13, also termed as UserInterface (UI), provided with an operator control panel on the apparatus housing, with a display and keys for operation of the device 1,
- an Input/Output Handler 15 for receiving and transmitting digital data via the network 10 from the digital environment,
- a storage unit 20 for storing print files,
- an accounting and security unit 27, which inter alia manages the authorization of users and access codes,
- an Unchained-Printing Client (UPC) 29 connected between the JobManager 12 and the network 10 for communicating with the Unchained-Printing Server (UPS), and
- a fetch module 30 for fetching a print data file from the print data storage function associated to the UPS, via the network 10.

Figure 4:
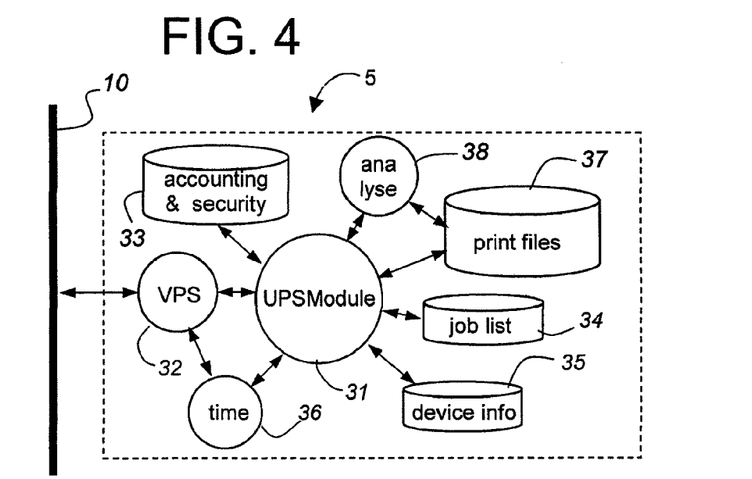
FIG. 4 is a diagram showing aspects of an Unchained-Printing Server according to the present invention.

FIG. 4 is a diagram showing aspects of the Unchained-Printing Server (UPS) 5. The UPS may be implemented as a PC having a high-capacity hard disc. It includes a UPS module 31, which controls all processes, and a Virtual Printer Server (VPS) 32. The UPS module 31 maintains four databases, one (37) including the print files submitted by users, one (33) including accounting and security information, a.o. permissions of users, one (34) including the list of the metadata of all jobs in the system and one (35) including information on the printers connected. The UPS 5 also has an analysis module 38 for analysing colour content of the print files stored in the database 37 as described above and designating individual pages of the print files for colour processing or black-and-white processing. Further, the UPS 5 includes a time server 36 for synchronizing the workstations, the printers and the UPS, e.g. by using the well-known SNTP protocol.

The Virtual Printer Server (VPS) 32 manages the communication between the printers and the UPS module 31. It exchanges messages with the printers when an event occurs at a printer, such as receiving, starting, finishing a print job, malfunctions, etc. Further, the VPS 32 senses when:

a printer goes down a printer comes up.

The accounting and security database 33 of the UPS 5 and those of the printers (27) are synchronized in order to assure that they contain the same information. Any changes in permissions and credits are entered by the system administrator in the database of the UPS and are then automatically distributed by the UPS to the corresponding databases in the printers. Also, when a print file of a yet unknown user arrives at a printer, and the JobManager 12 of that printer extracts the user name and updates its accounting and security database 27, the JobManager 12 also informs the UPS, which updates its database 33 accordingly and informs the other printers.

Although the UPS 5 has been described here as a hardware platform running both the server and storage function, other embodiments are contemplated by the inventors. For instance, the storage function may be implemented in the printers in a distributed way. Print jobs may in that case be submitted to one of the printers that store the print file, analyse it and send all information to the UPS that only performs the server function. Finally, the complete UPS process, including storage of jobs, may be implemented as a distributed process running in the controllers of the printers, and no specific hardware is required.

Figure 5:
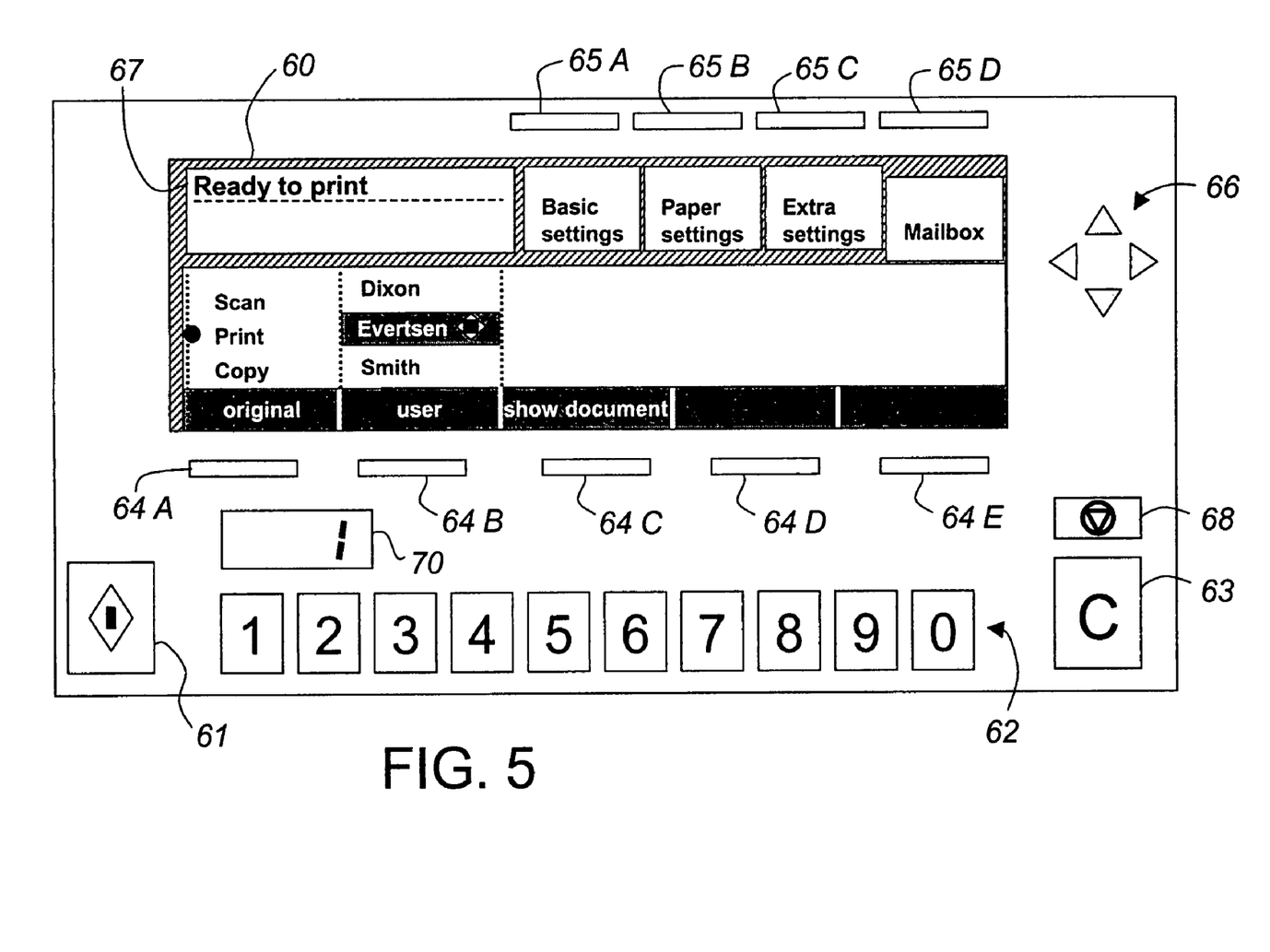
FIGS. 5 and 6 show examples of an operator control panel of a printer with a display image in various situations according to the present invention.

FIG. 5 shows an exemplary operator control panel 160 belonging to the operator control unit 13 of a printer. It includes a display screen 60, such as an LCD display, and a plurality of keys, e.g., a start key 61, number keys 62, a correction key 63, a stop key 68, selection keys 64A-64E, 65A-65D and the key cluster 66A-66D. All these elements are connected to the operator control unit 13, which in response to the operation of the keys passes signals to the JobManager 12 and which also controls the display screen 60 to display options and messages to the operator.

The selection keys 64A-64E are for selecting device functions, which are grouped in sets that can themselves be selected by the keys 65A-65D. Captions below the keys 65A-65D specify the sets, e.g., "Basic settings" such as simplex or duplex, staple, enlargement, "Paper settings" for selecting print sheet properties, and "Extra settings" such as lighter/darker, margin shift, etc. For each function group, a list of alternative settings for a function is shown for selection in a column above each key 64A-64E. By actuating a selection key, an operator can choose a different setting, e.g. in accordance with a cyclic pattern. The leftmost column is dedicated to the basic device function such as "Copy", "Print", or "Scan".

The operator control panel 160 also contains a number display 70 to indicate the number of copies set.

The procedure for handling print files for interactive printing according to the present invention will now be described. It is assumed that a print file that has pages containing colour and black-and-white-only pages is to be printed. As described above with respect to FIG. 2, the print file is analysed as to the colour content in the UPS and some of the pages are designated for colour processing, while others are designated for black-and-white processing. Then, the metadata of the print job are sent to the printers (1A, 1B and 1C).

Upon reception of the metadata of a new print job, the JobManager 12 of each printer stores the received metadata in its administration system 12a.

When an operator wants to have a specific data file printed, he must so instruct the printer via the operator control panel 160. First, he must select the function "Print" with the key 64A. In reaction, the operator control unit 13 requests the JobManager 12 to pass a list of all the active user names (names of users having at least one print job of the second type in the system). As shown in FIG. 5, the operator control unit 13 displays the user list on the display, in the column above the key 64B, whereafter the user can select his name. If the list is too long to be displayed completely, a part of it is shown on the display and scrolling is possible using the star keys 66. Initially, the display focus is on the user who has last submitted a print job to the particular printer (in this example "Evertsen"), but the selection may be shifted to another user name using the star keys 66.

Figure 6:
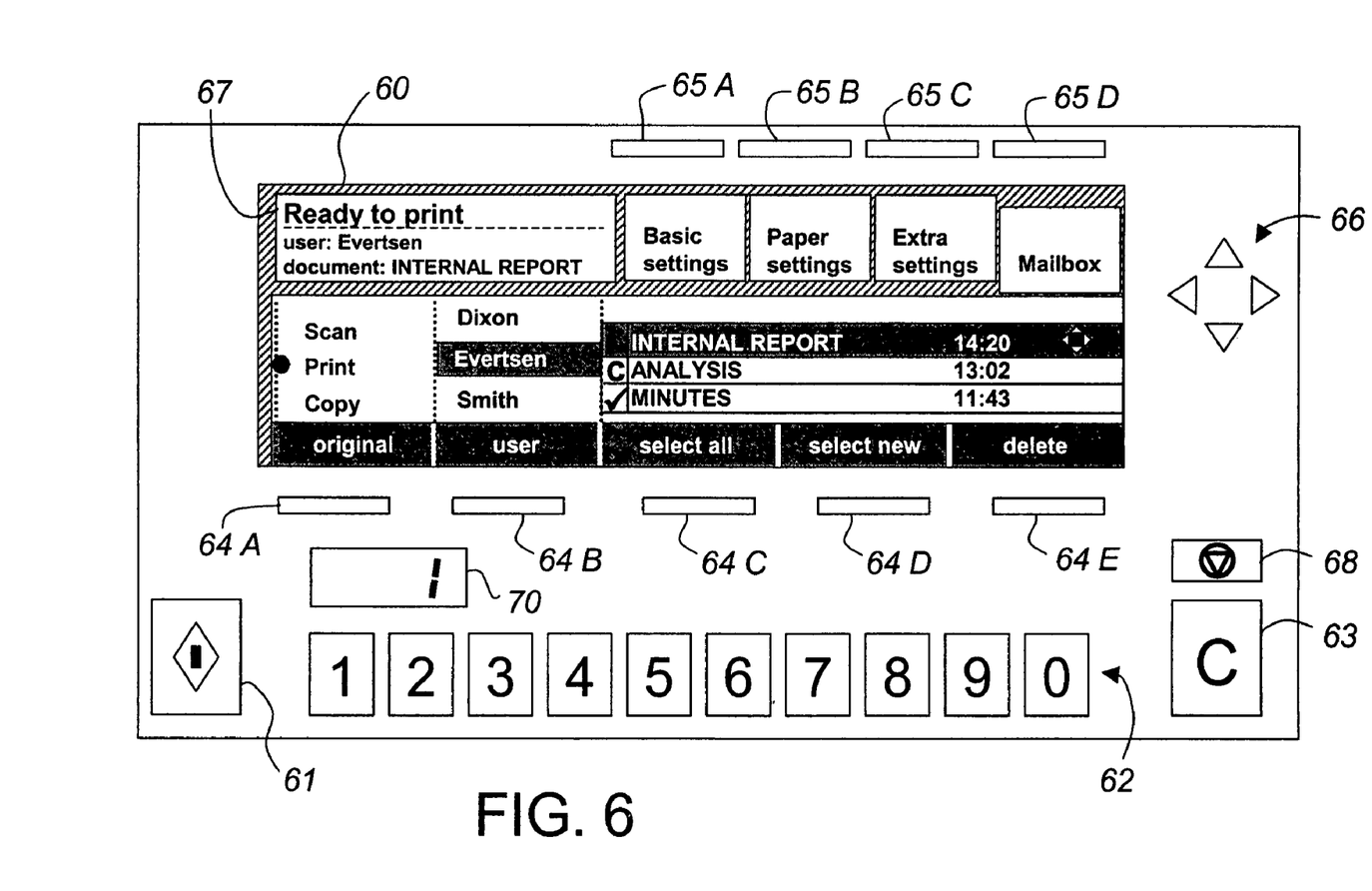

After the user has selected his name, he actuates the key 64C to obtain an overview of his own print jobs. In response to this, the JobManager makes up a current list of all interactive print jobs of the current user and passes it through to the operator control unit 13, which displays this list to the user for selection on the display 60. An example of such display image is shown in FIG. 6. The submission time of each job is shown at the side of the file name. A "tick" sign is shown at the left of a file name of a file that has been printed already. Likewise, a job that has partially been printed in the context of the present invention, e.g. only the colour pages or only the black-and-white pages, is shown with an added character "c" (for colour pages) or "b" (for black-and-white pages), at the left. If the list is too long to be displayed completely, a part of it is shown on the display and scrolling is possible using the star keys 66. Initially, the display focus ("selection") is on the print job submitted last to the particular printer (in this example "INTERNAL REPORT"), but the selection may be shifted to another job using the star keys 66. In this embodiment, the keys 64C-64E have functions for file management. The key 64C is for selecting all print jobs of the current user, the key 64D is for selecting the newly-arrived print jobs only, and the key 64E is for deleting any selected jobs.

After the selection of a print job, the printing process is started by actuating the start key 61.

Figure 7:
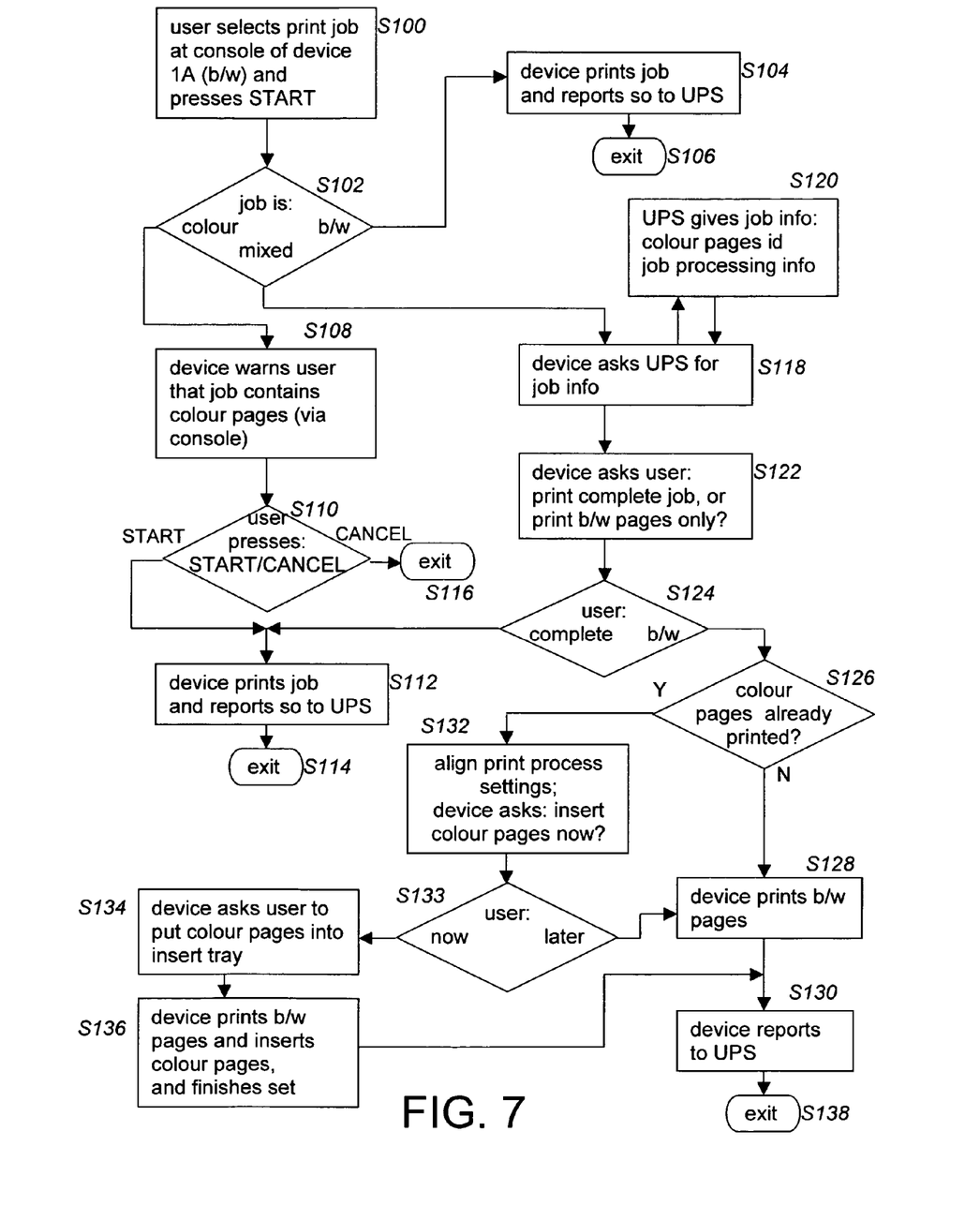
FIGS. 7 and 8 show flow charts of the process according to the present invention.
Figure 8:
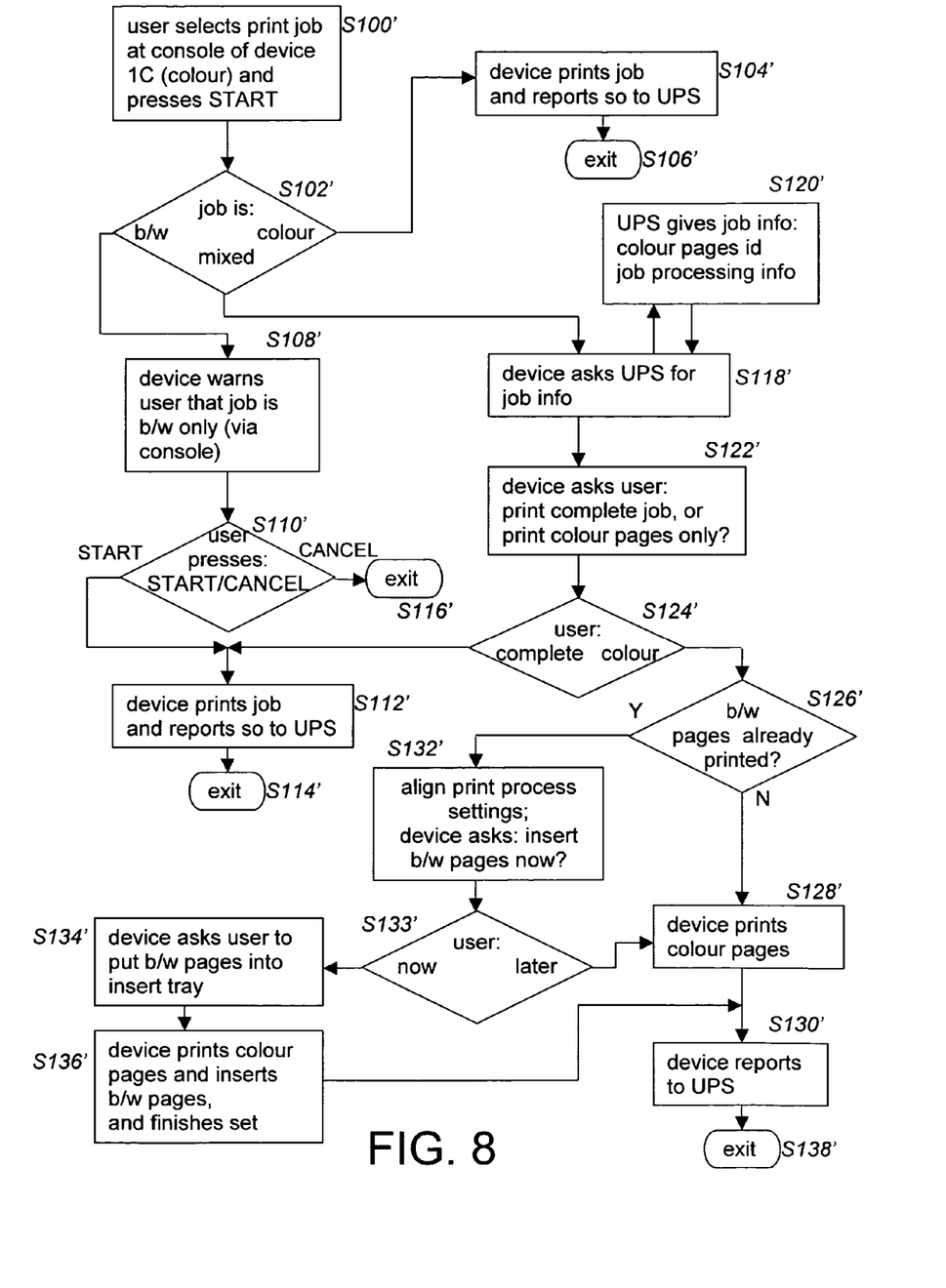

The process that follows is described with respect to either FIG. 7 if the printer is a black-and-white-only printer, or FIG. 8 if the printer is a colour printer. The flow sheets of FIGS. 7 and 8 are essentially identical, and therefore, only one (FIG. 7) will be explained here extensively.

In general, when a print job is of a "mixed" kind, i.e. it contains both colour-designated page(s) and black-and-white-designated page(s), an operator may choose to:

print the complete job on a colour printer (which is more expensive, because colour printers normally have a higher print price; also, colour printers are often slower than black-and-white ones)

print the complete job on a black-and-white-only printer (which may lose information), or print the colour pages on a colour printer and print the black-and-white pages on a black-and-white-only printer.

When the last option is chosen, the sub-sets made must be combined, which may be done off-line or, if the printer controllers are adapted therefor, on-line, by first printing the colour pages, loading them in a storage tray in the black-and-white printer, and inserting them at the correct places in the print flow (or vice-versa). In the latter option, automatic finishing, such as stapling, is still possible.

Now, going back to the process description and FIG. 7 according to the present invention, a user selects a print job at the black-and-white printer 1A (which in this case stands for any of the black-and-white printers involved) and presses the START key (S100). In response, the printer controller (JobManager 12) checks in the metadata and determines what kind of job it is (S102).

If the selected print job is a black-and-white-only job, the corresponding print data file is fetched from the central storage function by the fetch module 30, stored in the storage unit 20, converted to printable data ("RIPped") in the printing subsystem 2, and printed (S104). Thereafter the UPS is informed so that it can update its list of job statuses in the database 34. This finalizes the process (S106).

If step S102 determines that the selected print job is a colour-only job, the printer shows a warning on the console display 160 that the job is all-colour, and asks the operator if he really wants to have it printed on that black/white printer 1A (S108). The operator may respond by pressing either the START key 61 to go on printing or the CANCEL key 63 to stop the processing (possibly to go to a colour printer) (S110). When the operator chooses to go on printing, the corresponding print data file is fetched from the central storage function by the fetch module 30, stored in the storage unit 20, converted to printable data ("RIPped") in the printing subsystem 2, and printed and reported to the UPS (S112), thereby finalizing the process (S114). Otherwise, the process ends (S116).

If step S102 determines that the selected print job is a mixed job, the JobManager 12 asks the UPS for detailed information concerning the colour content, e.g., the page numbers of the colour-designated pages and/or those of the black-and-white-designated pages (S118) and the UPS provides such information (S120). Alternatively, the detailed colour content information may be incorporated in the metadata of the job and therefore already present in the job administration 12a of the printer. The information from the UPS also includes job processing information, such as, if the colour pages have already been printed on a colour printer, the process settings used therefor.

Figure 9:
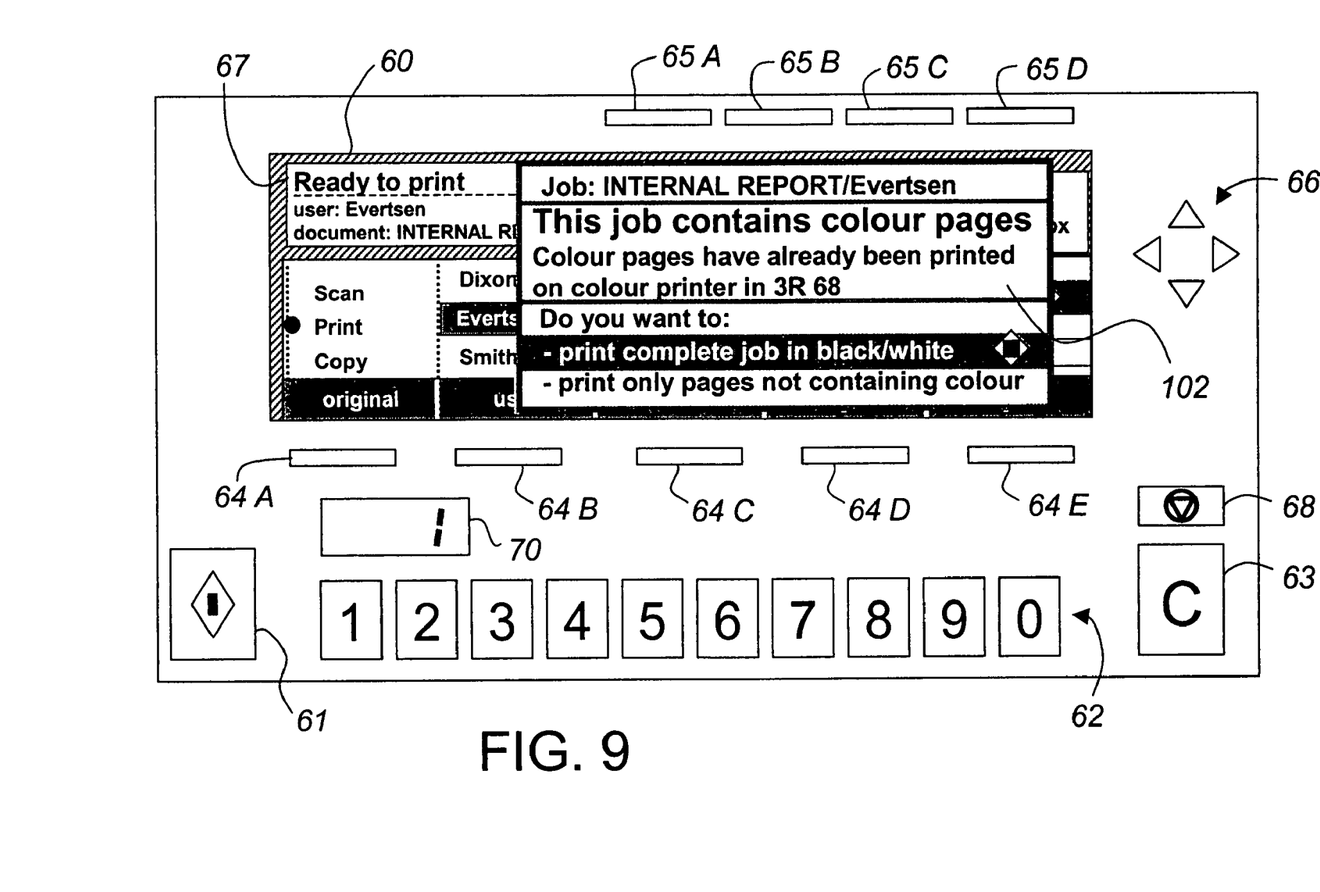
FIGS. 9 and 10 show examples of further operator control panel display images in various situations according to the present invention.

Next, the printer asks the operator if he wants to have the job completely printed (including both the colour and the black-and-white pages), or have the black-and-white pages printed only (S122). In the latter case (black-and-white pages only), the colour pages may be printed by a colour printer and the printed colour pages may be combined with the printed black-and-white pages. FIG. 9 shows an example of a display screen message for this purpose. As shown, a forced dialogue box 102 is superimposed on the screen image showing the job selection.

If the operator opts (S124) for the complete job, the process jumps to step S112, the job is printed and reported to the UPS.

If, on the other hand, the operator opts (S124) for printing the black-and-white pages only, the JobManager 12 checks (S126) in the job processing data received from the UPS in step S120, if the colour pages of the job have already been printed on another printer (i.e., a colour printer).

In the case that the colour pages of the print job have already been printed (S126), the forced dialogue of step S122, shown in FIG. 9, says so and its choice is automatically set as a default on the printing of the black-and-white pages only.

If at step S126 it is determined from the job processing data that the colour pages of the job have not yet been printed, the printer now fetches the print image data and prints the black-and-white-designated pages of the job (S128), automatically ignoring any finishing settings that would prevent combining the printed pages with the coloured pages yet to be printed (such as stapling) and reports so to the UPS (S130).

If at step S126 it is determined from the job processing data that the colour pages of the job have already been printed, the device checks if the settings used therefor were equal to those presently selected at the current (black-and-white) printer, and if not, informs the operator. The latter may then choose to accept the former settings for the present process (which is set as default), or to stay with the presently selected settings. This is shown in FIG. 7 by the box "align print process settings" (S132).

Further, the device asks the operator via the console display if he wants to have the colour pages inserted automatically during the print process of the black-and-white pages, or wants to insert the colour pages later off-line (S133).

If the operator opts for automatic insertion ("now" at step S133), the device asks him to put the printed colour pages into a storage tray for insert sheets (S134), and then fetches the print data, RIPs them and prints the black-and-white pages of the job, while inserting the colour pages from the storage tray at the appropriate places in the set (S136). In principle, the combination of colour and black-and-white pages is at page level, which means that a print sheet may carry a colour print on one side and a black-and-white print on the other. If the job settings specify finishing operations, such as stapling, the device does so (still in step S136). Finally, the printer reports its actions to the UPS (S130). This finalizes the processing at one printer (S138).

Figure 10:
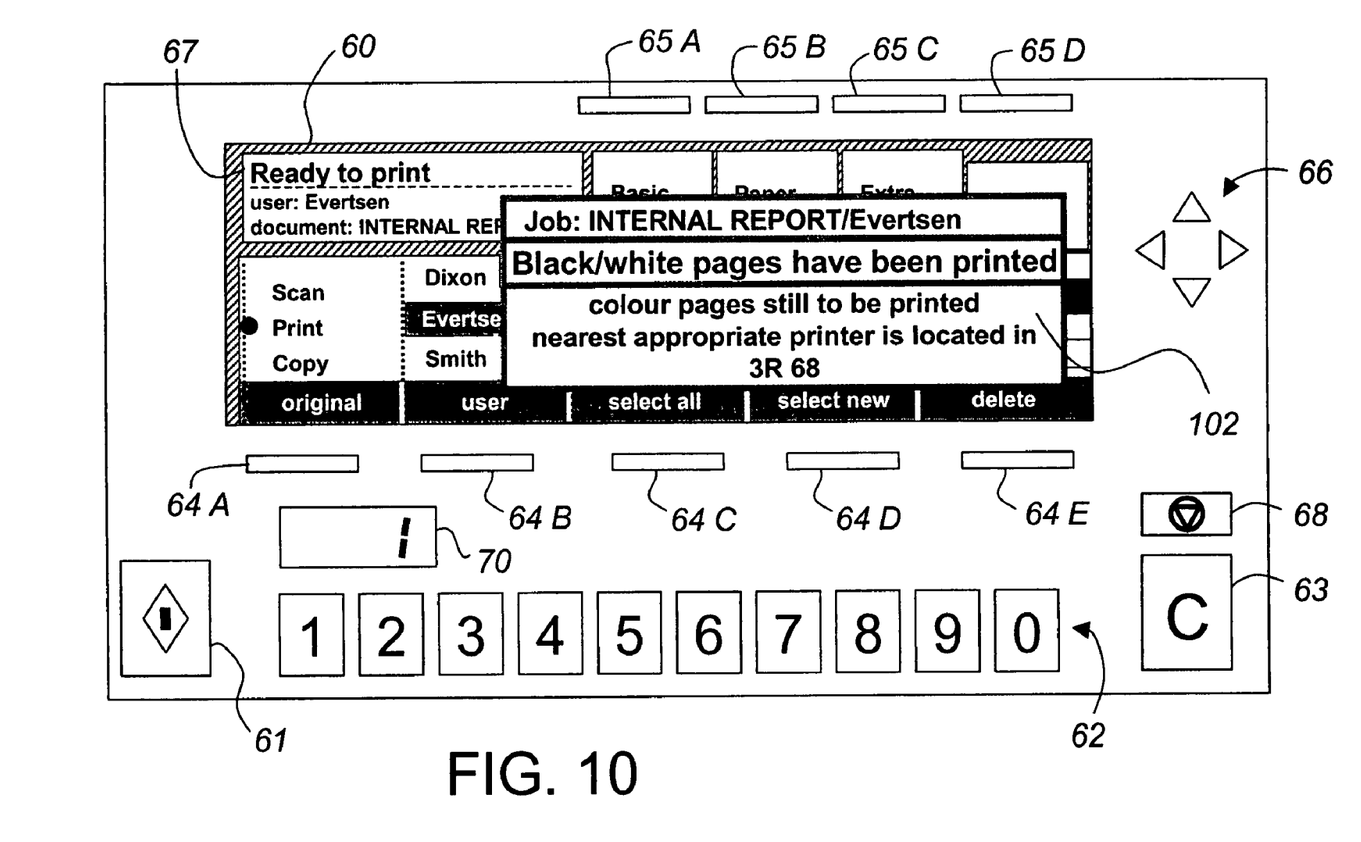

In the case that only the black-and-white pages were printed (S128), the operator is advised by a message on the display screen of the printer console 160 to print the colour prints of the job at a colour printer, as shown in FIG. 10. This message may also contain extra information for the operator that may help him to complete the job in an easy way, such as the location of the nearest colour printer.

Also in the case that only the black-and-white pages were printed (S128), the operator may now walk to the colour printer 1C to have the colour pages of the same print job printed and complete the print process. This part of the process is described by the flow chart of FIG. 8, which essentially parallels that of FIG. 7. The printer 1C mentioned in FIG. 8 stands for any colour printer in the system. In this regard, reference numbers (S100'-S138') correspond to those of FIG. 7, but carry an accent (e.g., S100' corresponds to S100). A detailed description of this flow chart is omitted, since the particulars are considered immediately clear for the skilled person.

As should be clear from the description, for mixed jobs it is up to the choice of the operator if he starts the print job at the black-and-white printer and finishes at the colour printer, or vice versa.

When a data file has been printed, it remains in principle stored in the storage unit 20 until it is removed by the user himself or the manager of the apparatus. To this end, the user gives a command for removal of a selected file. In response to this, the JobManager 12 passes a command to delete the file from the storage unit 20 and removes the identification data of that file from its administration system 12a. A "time-out"

function may be provided to automatically delete a print file after a predetermined time interval.

After having printed the job, the printer sends a report message to the UPS, which instructs all printers to mark the print job as "completely printed" or "partially printed", respectively, in their administration systems and selection lists. Marking a job as "completely printed" is effected by displaying a mark (e.g., a "tick sign") next to the file name in the list, while partially printed jobs are shown with, e.g., a "c" or "b" on the display for jobs of which only the colour pages or only the black-and-white pages, respectively, have been printed.

When a print job is deleted by a user at the console of any of the printers, that printer sends a message to that effect to the server function, which deletes the print data of that job from storage and instructs all printers to delete the metadata of that job from their administration systems.

A "time-out" function may be included within the server function to automatically erase the print data of a print job from storage and to instruct the printers to delete that print job from their administration systems, after a predetermined time interval T1 since the time of arrival of the print file in the system. The time counter may start anew after the first one (or any one) of the colour or black-and-white sub-sets have been printed, for a time interval T2, in order to keep the print file longer available for printing the other sub-set in order to complete the job.

A special form of a print file is an image or series of images generated by scanning documents in a scanner, such as the scanner of any of the digital copiers used as printers in the description above. In a variant of the present invention, also scanned images are included in the list of print files made available for selection and printing on the connected printers. Such scanned files may be identified by the term "copy job" and an identification of the copier on which the scan file was made and the time of scanning. If an accounting is active, then the account name may be used for identification of the scan file. Such scanned print files are expressly included in the present invention.

The processing steps of the present invention are implementable using existing computer programming language. Such computer program(s) may be stored in memories such a RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based service.

The invention being thus described, it will be obvious that the same may be varied in many ways. Such variations and modifications as would be obvious to one skilled in the art are intended to be included within the scope of the following claims.

The invention claimed is:

1. A method of printing documents in a network system including a printer of a first type and a printer of a second different type, the documents including pages having different device-specific properties such that some of the pages are for printing on a printer of the first type and other pages are for printing on a printer of the second type, the method comprising:
   submitting a print job for printing;
   automatically analyzing data of the print job with respect to device-specific properties of its pages and designating each page, on the basis of the analysis, either for processing on a printer of the first type or for processing on a printer of the second type;
   automatically making the entire print job locally available for selection and subsequent print processing by commands from the relevant printer's local user interface, on all printers of the first type as well as on all printers of the second type, irrespective of any print processing of that job in other printers, and leaving that print job available for printing on any of the other printers;
   locally starting printing of a respective print job on an arbitrary one of said printers, irrespective of the type of that printer, through selection of the job from a list of available print jobs and a print command on the local user interface of that printer; and
   during the print processing of said print job, automatically selecting those pages of the job that are designated for that type of printer, and printing those selected pages only.

2. The method of claim 1, wherein the printer of the first or second type, whichever is used second for printing the print job, automatically retrieves information regarding the processing by the printer used first, when the printer used second is started for printing the pages not yet printed, and if appropriate adjusts its own processing thereto.

3. The method of claim 2, wherein an operator at any of the printers is presented with a choice between printing the pages designated for that kind of printer, and printing the complete print job with imperfect processing.

4. The method of claim 1, wherein a printer communicates information on its own processing of a print job to other printers in the system and/or to a central system server.

5. The method of claim 4, wherein said information includes print job status information.

6. The method of claim 4, wherein said information includes information on process settings used for printing a print job.

7. The method of claim 1, wherein a printer printing its share of a print job presents information on possible other printers for printing the rest of the job, on its local user interface.

8. The method of claim 1, wherein a printer of the first type is a colour printer and a printer of the second type is a black-and-white-only printer, and the print job contains both colour and black-and-white pages.

9. The method of claim 8, further comprising:
   locally starting a print job on a first printer that is appropriate for printing either the colour-designated pages or for black-and-white-designated pages;
   loading the pages printed by the first printer into an insert tray of a second printer that is appropriate for printing the pages not yet printed; and
   upon locally starting of the print job on the second printer, automatically printing the pages not yet printed and inserting the pages printed by the first printer from the insert tray at appropriate places.

10. The method of claim 1, wherein a printer of the first type is a printer capable of printing on more or other print media sizes than the second type printer, and the print job contains pages of different sizes of which at least one is not supported by one of the printer types, while being supported by the other type printer.

11. The method of claim 1, wherein a printer of the first type is a printer capable of processing more or other print definition languages (PDLs) than the second type printer, and the print job contains pages encoded in different PDLs of which at least one is not supported by one of the printer types, while being supported by the other type printer.

12. A network system of user workstations, a printer of a first type and a printer of a second different type, for printing documents having pages with different device-specific properties, such that some of the pages are for printing on a printer of the first type and other pages are for printing on a printer of the second type, the system comprising:
   a print service including an analysis module for automatically analyzing data of a print job with respect to device-specific properties of its pages and designating each page, on the basis of the analysis, either for processing on a printer of the first type or for processing on a printer of the second type,
   system means for automatically making the entire print job locally available for selection and subsequent print processing by commands from the relevant printer's local user interface, on all printers of the first type as well as on all printers of the second type, irrespective of any print processing of that job in other printers, and leaving that print job available for printing on any of the other printers;
   system means for locally starting printing of a respective print job on an arbitrary one of said printers, irrespective of the type of that printer, through selection of the job from a list of available print jobs and a print command on the local user interface of that printer; and
   system means for during the print processing of said print job, automatically selecting those pages of the job that are designated for that type of printer, and printing those selected pages only;
   wherein the print service is further adapted to receive print files from a workstation and make them locally available for printing, on a plurality of connected printers, and
   the printers are adapted to automatically select and print only the pages of the print job that are designated for processing on a printer of their own type.

13. The system of claim 12, wherein the printers are adapted to, upon being started for printing a print job, automatically retrieve information regarding any processing of that same job by a printer of a different type, and if appropriate to adjust its own processing to that processing.

14. The system of claim 12, wherein a printer is adapted to communicate information on its own processing of a print job to other printers in the system and/or to the print service.

15. The system of claim 14, wherein said information includes print job status information.

16. The system of claim 14, wherein said information includes information on process settings used for printing a print job.

17. The system of claim 12, wherein a printer of the first type is a colour printer and a printer of the second type is a black-and-white-only printer.

18. The system of claim 12, wherein a printer of the first type is a printer capable of printing on more or other print media sizes than the second type printer.

19. The system of claim 12, wherein a printer of the first type is a printer capable of processing more or other print definition languages (PDLs) than the second type printer.

20. A computer program product embodied on at least one computer readable medium, for printing documents in a network system including a plurality of printers of first and second types, the documents including pages having different device-specific properties such that some of the pages are for printing on a printer of the first type and other pages are for printing on a printer of the second type, the product comprising computer-executable instructions for:
   submitting a print job for printing;
   automatically analyzing data of the print job with respect to device-specific properties of its pages and designating each page, on the basis of the analysis, either for processing on a printer of the first type or for processing on a printer of the second type;
   automatically making the print job locally available for selection and subsequent print processing by commands from the relevant printer's local user interface, on all printers of the first type as well as on all printers of the second type, irrespective of any print processing of that job in other printers, and leaving that print job available for printing on any of the other printers;
   locally starting printing of a respective print job on an arbitrary one of said printers, irrespective of the type of that printer, through selection of the job from a list of available print jobs and a print command on the local user interface of that printer; and
   during the print processing of said print job, automatically selecting those pages of the job that are designated for that type of printer, and printing those selected pages only.

* * * * *